AUTOMATIC ADJUSTABLE EQUALIZER FOR SIGNAL AMPLITUDE VARIATIONS

Filed Dec. 21, 1961 2 Sheets-Sheet 1

INVENTOR
A. P. STAMBOULIS
BY
[signature]
ATTORNEY

AUTOMATIC ADJUSTABLE EQUALIZER FOR SIGNAL AMPLITUDE VARIATIONS

Filed Dec. 21, 1961 2 Sheets-Sheet 2

INVENTOR
A. P. STAMBOULIS
BY Charles Scott Phelan
ATTORNEY

United States Patent Office 3,205,442
Patented Sept. 7, 1965

3,205,442

AUTOMATIC ADJUSTABLE EQUALIZER FOR SIGNAL AMPLITUDE VARIATIONS

Anastasios P. Stamboulis, Port Monmouth, N.J., assignor to Bell Telephone Laboratories, Incorporated, New York, N.Y., a corporation of New York
Filed Dec. 21, 1961, Ser. No. 161,060
6 Claims. (Cl. 325—320)

This invention relates to an automatic equalizer of a type which may, for example, be employed for frequency shift signals in switched networks.

In frequency shift data transmission systems, mark and space data bits are each represented by an interval during which oscillations of an individual frequency are transmitted. Thus, the frequency shift signal is, in fact, a frequency modulated signal.

It is well known that the problem of detecting frequency modulated signals can be influenced by any undesired amplitude modulation which may be present on the frequency modulated signal. In the case of frequency shift signals, such amplitude modulation results in mark-space bias that tends to introduce detection errors. Equalization may be employed in fixed networks to correct for the differential attenuation of the line, and in switched networks automatic equalization schemes have been employed with some success, but the prior art automatic schemes are not capable of dealing with the uncertainty as to the average level of received signals. This uncertainty is due to the fact that the level at which the frequency modulated signals will be received is a function of the unknown length of the transmission route in the switched network for any particular message.

Typical of prior art automatic equalizers is one that detects amplitude modulation in the received signal and produces a control signal which is intended to be proportional to the voltage difference between the input signal amplitudes that are to be equalized. When the average level of received signals varies over a wide range, the control signal may be drawn out of the desired operating range; and the compensation produced is then no longer proportional to the voltage amplitude difference between signal amplitudes that are to be equalized.

Accordingly, it is a principal object of this invention to improve automatic equalizers.

Another object is to broaden the range of input signal amplitudes to which an automatic equalizer may respond accurately.

These, and other objects of the invention, are realized in an illustrative embodiment in which an automatic equalizer is provided with a network that is responsive to the transmission equivalent of undesired amplitude modulation in a frequency modulated signal. The transmission equivalent is, of course, a logarithm of an amplitude ratio and automatically takes average levels into account. The output from this network is utilized to reduce the undesired amplitude modulation.

It is one feature of the invention that a network with a logarithmic transfer characteristic is utilized, together with amplitude modulation detecting equipment, to generate a control signal for activating a complementary attenuation network.

It is another feature of the invention that undesired amplitude modulation is reduced by transmitting a frequency modulated signal which includes such amplitude modulation through an attenuation network having an attenuation versus frequency characteristic that may be varied as a function of the transmission equivalent of the amount of amplitude modulation.

The recited features, and various combinations of these and other features comprising the present invention, are set forth in the appended claims. However, a detailed presentation of an illustrative embodiment of the invention is contained in the following description which may be considered together with the attached drawing in which:

FIG. 1 is a block and line diagram of an automatic equalizer in accordance with the invention;

FIG. 2 includes a series of voltage wave diagrams illustrating the operation of the invention;

Figure 1:
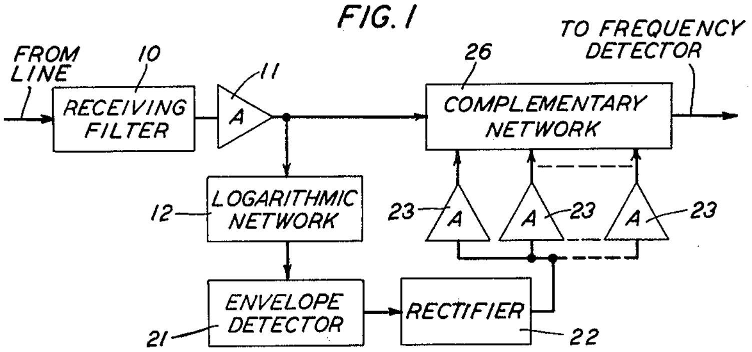

Frequency shift data signals are applied to the circuit of FIG. 1 from any suitable transmission line (not shown) which may, for example, comprise a part of a switched network. These signals may be made up of successive data bit intervals which include oscillations at a first frequency $f_m$ for a mark bit interval and at a second frequency $f_s$ for a space bit interval. In a typical data system the mark and space frequencies may be, for example, 1325 cycles per second and 2075 cycles per second, respectively. If any part of the switched network over which these signals have passed was not properly equalized, the sloping attenuation versus frequency characteristic of that part may be evident because the mark and space frequencies may be differently attenuated so that they would have different amplitudes when received by the circuit of FIG. 1. It is this differential attenuation which is corrected by the FIG. 1 circuit.

A receiving filter 10 band limits received signals to exclude as much energy as possible which is outside of the range of the data bit frequencies. An amplifier 11 may also be connected to the output of filter 10 in some applications. At the output of amplifier 11 the data signals may typically take one of the forms shown in FIG. 2A or FIG. 2B. The former figure represents the ideal condition with no differential attenuation of the signals while FIG. 2B illustrates a typical condition of differential attenuation in which the space frequency is attenuated to a greater extent than is the mark frequency. In either case, the average amplitude of the data signals at the output of amplifier 11 may vary over a wide range depending upon the composition of the transmission route in the switched network through which the signal was received. In some instances this average amplitude may be quite small, for example, it may be only a fraction of a volt, but under other network conditions it may run several volts more.

The output of amplifier 11 is applied to a logarithmic network 12. Network 12 is adapted to reproduce the signal frequencies essentially as received but with the amplitude modulation thereon being in the output of network 12 proportional to the transmission equivalent of any difference between the mark and space frequency amplitudes at the network input. Thus, if the mark and space frequencies have been differently attenuated during transmission they may appear at the input of network 12 as a mark voltage $E_{im}$ and a space voltage $E_{is}$. Thus, the difference in amplitudes at the input to network 12 is $(E_{im}-E_{is})$. However, at the output to network 12 the difference between the mark and space frequency amplitudes is a voltage which is approximately proportional to $$20 \log_{10} \frac{E_{im}}{E_{is}}$$

Figure 3:
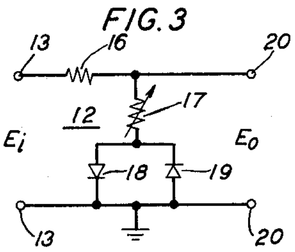
FIGS. 3 and 5 are schematic diagrams of parts of the equalizer of FIG. 1.

One specific circuit for converting the amplitude modulation of received data signals from a simple voltage difference into a difference which is a function of the logarithm of the two input voltage amplitudes is shown in FIG. 3. This circuit represents the logarithmic network 12 and includes input terminals 13, 13 to which the data signals from amplifier 11 are applied. Two resistors 16 and 17 are connected in a series circuit with a parallel connected combination of two varistors 18 and 19 between input terminals 13, 13. Output signals from network 12 are taken across a portion of the series circuit including the parallel combination of varistors 18 and 19 and appear at output terminals 20, 20.

Figure 4:
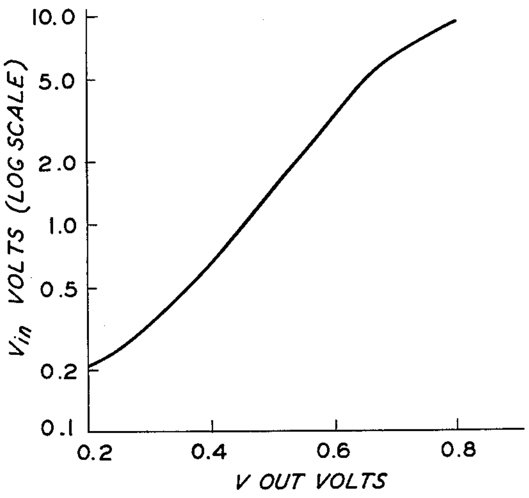
FIGS. 4 and 6 illustrate typical transfer characteristics of the circuits employed in FIGS. 3 and 5, respectively.

FIG. 4 shows typical voltage transfer characteristics for the network of FIG. 3. In FIG. 4 input voltages are plotted on a logarithmic scale against output voltages to produce a substantially straight characteristic evidencing the linear relationship between the output voltage and the logarithm of the input voltage ratio.

Resistor 16 is included in the circuit of FIG. 3 as a current limiting device, and resistor 17 is included to optimize the shape and slope of the network characteristic through a limited range. In one embodiment resistor 16 was 27,000 ohms, resistor 17 was 520 ohms, and varistors 18 and 19 were semiconductor diodes of the Western Electric 420G silicon alloy junction type. A typical forward voltage versus forward current characteristic for such a diode is essentially a straight line with a positively sloping characteristic for increasing voltages up to about one volt and for forward currents in the range of 0.05 milliampere to about 100 milliamperes, when both the voltage and the current are plotted on logarithmic scales. Such characteristic is not illustrated in the drawing since it comprises a part of the standard data sheet for the diode.

Varistors 18 and 19 are oppositely poled with respect to one another so that the same logarithmic function may be applied to both positive and negative input signals. The adjustment of resistor 17 changes the portion of the diode characteristic on which circuit 12 operates in order to facilitate calibration of the system by varying the shape of the network characteristic as previously mentioned. The reverse breakdown voltage of the varistors 18 and 19 is normally much larger than any input signal amplitude that is anticipated so the reverse characteristic of the varistors need not be considered.

Figure 2:
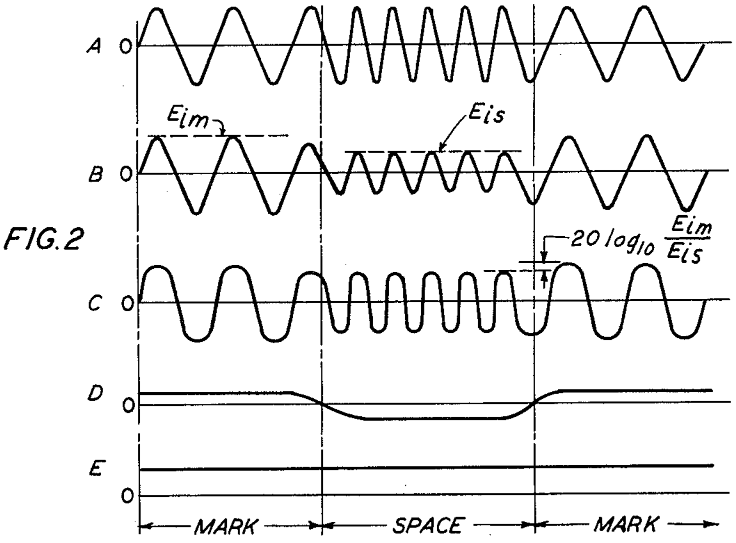

Returning now to FIGS. 1 and 2, the output of network 12 is illustrated in FIG. 2C for the input conditions that are illustrated in FIG. 2B. It will be noted that the amplitude difference between the mark and space frequencies in FIG. 2C is somewhat smaller than in FIG. 2B. That is because this difference is now a function of the decibel difference in signal frequency amplitudes rather than the voltage difference between these amplitudes. An envelope detector 21 receives the output of network 12 and produces an output signal which represents the data bit rate amplitude variations in the frequency modulated data signal. This detector may comprise any of the well known circuits for the purpose such as a half-wave rectifier device working in tandem with a low-pass filter which is designed to pass frequencies at the data bit rate but to attenuate severely the frequency modulation carrier frequencies $f_m$ and $f_s$.

A full wave rectifier 22 receives the output of detector 21 and produces a direct-current control current signal which is a function of the envelope amplitude. This rectifier would normally be alternating current coupled to detector 21 so that it would see an alternating current signal as illustrated in FIG. 2D rather than a varying direct-current signal. The output of rectifier 22 is illustrated in FIG. 2E and has a magnitude which is a function of the transmission equivalent of any amplitude modulation which may appear on the frequency modulated signals in the output of amplifier 11. One or more current amplifiers 23 may be connected to the output of rectifier 22 for applying the control current to the stages of a complementary attenuation network 26.

Figure 5:
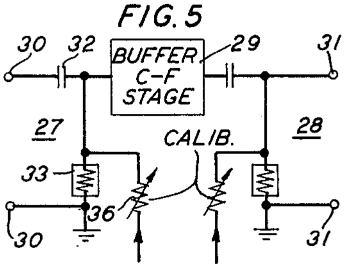

Network 26 is a frequency sensitive attenuation network with adjustable characteristics for attenuating the data signals from amplifier 11 to offset amplitude modulation in those signals. One form which the complementary network 26 may take is illustrated in FIG. 5 and comprises two controllable high-pass filter sections 27 and 28 which are coupled together by a buffer stage 29 that may, for example, be a cathode follower amplifier. The number of sections used depends upon the maximum amount of attenuation required for a particular system. Frequency modulated data signals which may include some amplitude modulation are applied to input terminals 30, 30 of the network 26. Controlled complementary attenuation is applied by the network so that the frequency modulated signals appear at output terminals 31, 31 with essentially no amplitude modulation.

Since each section of the network in FIG. 5 is essentially the same as all others, only one need be described. This section includes a capacitor 32 and a current sensitive impedance, such as thermistor 33, connected in series between input terminals 30, 30. Control signals from one of the amplifiers 23 are applied through a calibrating resistor 36 to the common junction of capacitor 32 of thermistor 33. Section output signal is derived from the same junction and is applied to buffer stage 29, or to the network output terminals 31, 31 if the section happens to be the last one in the network.

One thermistor that has been found to be suitable for this application is the Western Electric 8*b* thermistor. Control currents applied to calibrating resistor 36 should in all conditions be substantially larger than frequency modulation signals applied to the input of the section so that the frequency modulated signals may have no significant effect upon the thermistor operation.

Capacitor 32 is assigned a capacitance value so that the combination of its capacitance, together with the resistance of thermistor 33, comprise a high-pass filter with the low frequency cutoff portion of its characteristic including at least one of the mark or space frequencies of the data signal. The resistances of resistor 36 and amplifier 23 are normally so large compared to thermistor resistance that they can be neglected. Thus, when the resistance of thermistor 33 is changed by the control current, the low frequency cutoff of the filter section is changed and the attenuation to which frequencies in the cutoff region are subjected is similarly changed. In one embodiment using an 8*b* thermistor, capacitor 32 was given a capacitance of 0.25 microfarad to produce the characteristics of FIG. 6.

Figure 6:
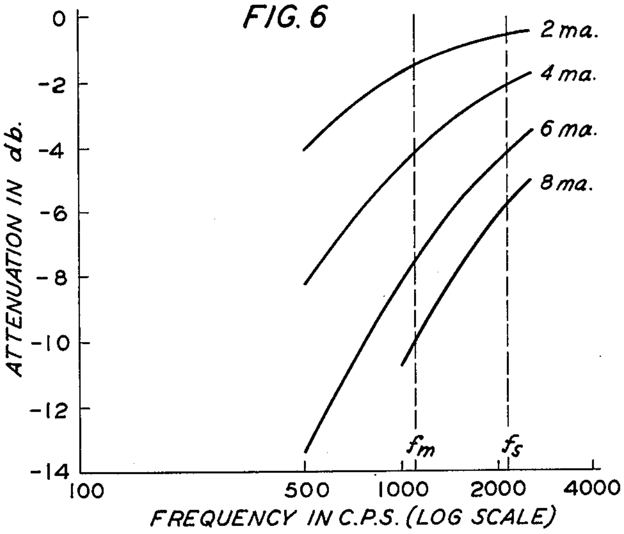

One or more sections of the type described may be utilized to produce an attenuation versus frequency characteristic similar to that illustrated in FIG. 6 for complementary network 26. In the latter figure the attenuation is plotted on a linear scale and the frequency is plotted on a logarithmic scale. The family of characteristics includes a series of gently curving lines with positive slope for increasing frequency and decreasing attenuation. Each characteristic line represents a different level of control current applied to varistor 33, and characteristic line slopes increase with increasing control current.

The mark frequency $f_m$ and space frequency $f_s$ are included on the axis of abscissas in the figure. It may be seen in FIG. 6 that for a control current of 8 milliamperes the attenuation by network 26 of the mark frequency is substantially greater than the attenuation of the space frequency; but if the control current is reduced to 2 milliamperes, there is a much smaller difference in the attenuation of the two frequencies.

Summarizing, the logarithmic network 12 cooperates with envelope detector 21 and rectifier 22 to generate a control signal having a magnitude which is proportional to the transmission equivalent of amplitude modulation which may be present in frequency modulated signals appearing at the output of amplifier 11. This control signal is applied to a complementary network 26, which also receives the frequency modulated signals, to control the attenuation versus frequency characteristic of that network so that it is essentially the complement of the attenuation versus frequency characteristic of the transmission path through which the frequency modulated signals passed before arriving at the output of amplifier 11. Compensated frequency modulated signals in the output of network 26 may then be applied to any suitable demodulator (not shown) wherein the mark and space data bits of the signal may be accurately detected. If a change takes place in the characteristics of a transmission path through which data signals are received, the resulting change in differential attenuation of mark and space frequencies is detected, and the control signal is adjusted in magnitude to maintain its proportionality with respect to the new condition of differential attenuation. At all times, however, the circuit operates as a function of the transmission equivalent of the detected differential amplitudes so that accurate amplitude compensation is applied to the signals over a wide range of input signal average amplitudes.

Although the present invention has been described in connection with a particular embodiment thereof, it is to be understood that additional embodiments and modifications which will be apparent to those skilled in the art are included within the spirit and scope of the invention.

What is claimed is:

1. An automatic equalizer for frequency modulated signals having undesired amplitude modulation, said equalizer comprising a logarithmic network receiving said signals and producing in its output said frequency modulated signals with the degree of amplitude modulation being modified to be proportional to the transmission equivalent of the amplitude modulation on the signals at the input to said network, means generating a control signal with an amplitude which is a function of the amount of amplitude modulation in signals at the output of said network, and means responsive to said frequency modulated signals and to said control signal for reproducing said frequency modulated signals with substantially no amplitude modulation.

2. The automatic equalizer in accordance with claim 1 in which said control signal generating means comprises an envelope detector and a full wave rectifier connected to the output of said detector for producing a direct-current control signal.

3. The automatic equalizer in accordance with claim 1 in which said logarithmic network includes current sensitive resistance means having a substantially linear logarithmic voltage versus current characteristic.

4. The automatic equalizer in accordance with claim 3 in which said resistance means comprises two varistors connected in parallel in a shunt branch of said network and poled for the forward conduction of electric current in opposite directions.

5. An automatic equalizer comprising a resistor, two varistors connected in parallel with one another and poled for the forward conduction of electric current in opposite directions, means connecting said resistor and said varistors in a series connection to receive frequency modulated signals having amplitude modulation thereon, said varistors having a substantially linear logarithmic voltage versus forward current characteristic, an envelope detector connected across said varistors, a full wave rectifier connected to the output of said detector, a compensating network connected to receive the same signals applied to said series connection, said compensating network including at least one section of attenuation means comprising a capacitor and a thermistor connected in series to receive said frequency modulated signals, means deriving an output from the common junction of said capacitor and the last mentioned thermistor, means applying the output of said full wave rectifier to said last mentioned thermistor for varying the resistance thereof in accordance with the magnitude of said rectifier output, and said capacitor comprising with the resistive elements of said section a high-pass filter having a low frequency cutoff characteristic including at least one of the frequencies of said frequency modulated signals.

6. An automatic equalizer for compensating electric signals at the receiving end of a transmission line for the sloping attenuation versus frequency characteristic of the line, said equalizer comprising a circuit generating a control signal having a magnitude which is a function of the transmission equivalent of differential attenuation in received signals from said transmission line, a variable attenuation network for producing compensated line signals and including at least one circuit section having in a series connection a capacitor and a current sensitive impedance, means applying said line signals across said series connection, means applying said control signal across said impedance for varying the slope of the attenuation versus frequency characteristic of said network with respect to said received signals, and means deriving an output signal at the junction of said capacitor and said impedance.

References Cited by the Examiner

UNITED STATES PATENTS

| | | | |
|---|---|---|---|
| 2,115,141 | 4/38 | Eckberg | 333—18 |
| 2,379,688 | 7/45 | Crosby | 329—132 |
| 2,483,192 | 9/49 | Goldberg | 329—131 |

HERMAN KARL SAALBACH, *Primary Examiner.*